United States Patent
Sollami et al.

(10) Patent No.: US 11,507,989 B2
(45) Date of Patent: Nov. 22, 2022

(54) MULTI-LABEL PRODUCT CATEGORIZATION

(71) Applicant: salesforce.com, inc., San Francisco, CA (US)

(72) Inventors: Michael Sollami, Cambridge, MA (US); Yang Zhang, Cambridge, MA (US)

(73) Assignee: Salesforce, Inc., San Francisco, CA (US)

(*) Notice: Subject to any disclaimer, the term of this patent is extended or adjusted under 35 U.S.C. 154(b) by 608 days.

(21) Appl. No.: 16/658,315

(22) Filed: Oct. 21, 2019

(65) Prior Publication Data

US 2021/0118024 A1 Apr. 22, 2021

(51) Int. Cl.
  *G06K 9/62* (2022.01)
  *G06Q 30/06* (2012.01)
  *G06N 20/00* (2019.01)
  *G06F 17/18* (2006.01)
  *G06N 3/02* (2006.01)

(52) U.S. Cl.
  CPC ......... *G06Q 30/0603* (2013.01); *G06F 17/18* (2013.01); *G06K 9/6267* (2013.01); *G06N 3/02* (2013.01); *G06N 20/00* (2019.01)

(58) Field of Classification Search
  CPC ...... G06N 3/0454; G06N 3/08; G06N 3/0445; G06N 20/10; G06N 20/00; G06N 3/084; G06N 7/005; G06N 20/20; G06N 3/02; G06N 5/003; G06N 3/0427; G06N 3/0472; G06N 3/0481; G06N 5/04; G06Q 50/18; G06Q 30/0603; G06Q 30/02; G06K 9/6267; G06K 9/6215; G06K 9/6256; G06K 9/6269; G06K 9/6232; G06K 9/6257; G06K 9/6277; G06K 9/628; G06K 9/629; G06K 9/6292; G06T 2207/20081; G06T 2207/20084; G06T 7/0012; G06T 11/206; G06T 2200/24; G06F 40/216; G06F 40/279; G06F 40/30
  See application file for complete search history.

(56) References Cited

U.S. PATENT DOCUMENTS 9,740,368 B1 * 8/2017 Love ................... G06F 3/04817
2021/0104245 A1 * 4/2021 Aguilar Alas ........ G10L 15/063
2021/0118024 A1 * 4/2021 Sollami .............. G06Q 30/0603

FOREIGN PATENT DOCUMENTS

WO  WO-2019174423 A1 * 9/2019 ............. G06F 40/20

* cited by examiner

Primary Examiner — Quan M Hua
(74) Attorney, Agent, or Firm — Butzel Long

(57) ABSTRACT

Systems, device and techniques are disclosed for multi-label product categorization. A catalog entry and a list of categories may be received. The catalog entry may be associated with an item. A textual description may be generated by comparing words in the catalog entry to existing vocabularies of words and applying part-of-speech tagging to the catalog entry. A feature vector may be generated from the textual description by applying any of token frequency feature creation, term frequency-inverse document frequency feature creation, and pre-trained word embeddings to the textual description. A set of probabilities may be determined by inputting the feature vector into a machine learning model. The set of probabilities may include a probability for each category in the list of categories.

20 Claims, 13 Drawing Sheets

MULTI-LABEL PRODUCT CATEGORIZATION

BACKGROUND

Categorization of products meant for sale may be done manually by workers with domain knowledge of the categories used by the seller. A seller, such as a website, may have a large number of products available for sale, and each product may belong to a number of different categories. A product may be categorized based on its name, description, and various attributes of the textual description of the product. Using workers to categorize products may be time-consuming and error-prone. Rule-based systems may be used instead of workers, and may match certain keywords to categories. However, categorization by rule-based systems may be incomplete, and it may be difficult to adjust the rules used as the products and their descriptions change.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
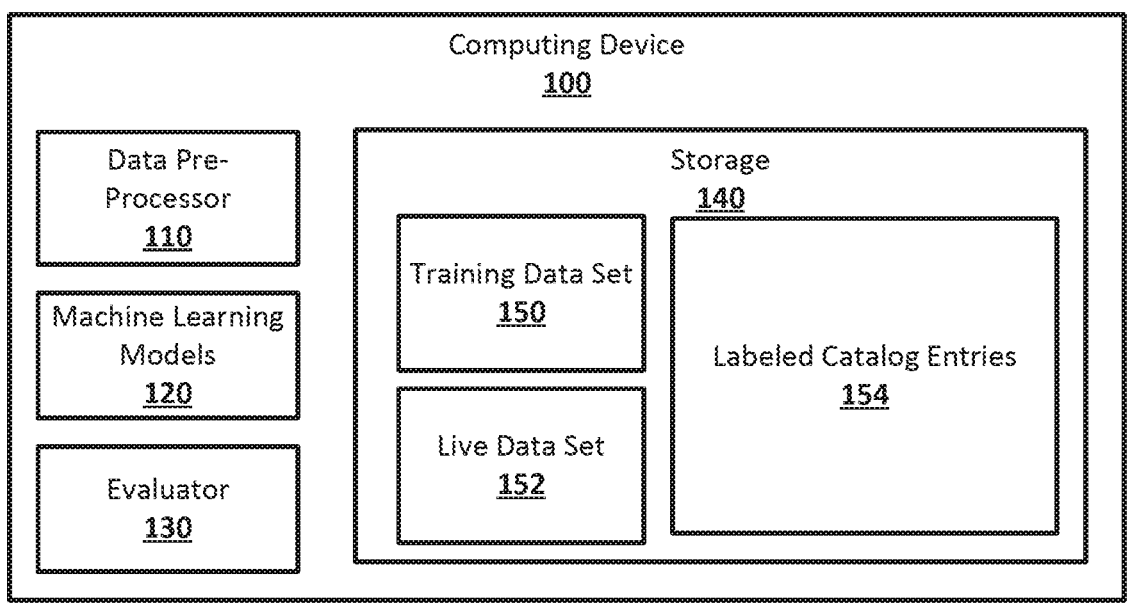
FIG. 1 shows an example system for multi-label product categorization according to an implementation of the disclosed subject matter.

Techniques disclosed herein enable multi-label product categorization, which may allow for a machine learning model to be trained to categorize a product into multiple categories based on a textual description of the product. A catalog entry that is associated with an item, such as a product, may be received along with a list of categories to be used in categorizing the item. The catalog entry may include text, such as a name and description of the item. A textual description of the item may be generated by comparing words in the text of the catalog entry to existing vocabularies of words and applying part-of-speech tagging to the words in the text of the catalog entry. Token frequency feature creation, term frequency-inverse document frequency feature creation, and/or pre-trained word embeddings may be applied to the textual description to generate a feature vector for the item. The feature vector for the item may be input to a machine learning model. The machine learning model may generate a set of probabilities indicating the probability that the item belongs to the various categories in the list of categories that was received along with the catalog entry. If the catalog entry is part of a live data set, the item may be labeled with categories based on the set of probabilities. If the catalog entry is part of a training data set, a selection of categories from the list of categories may be received along with the catalog entry. The selection of categories may be compared to the probabilities generated by the machine learning model to determine an error of and train the machine learning model. Multiple different machine learning models may be used to generate probabilities for the same feature vectors generated from a training data set of catalog entries, and the performance of the machine learning models may be compared. The lowest performing machine learning models may be discarded.

A catalog entry for an item may be received from any suitable source, and may be in any suitable format. For example, the catalog entry may be from a catalog of products listed for sale on a website, and the item in the catalog entry may be one of the products. The catalog entry may be in a format for use in a website, such as, for example, HTML format, and may include hyperlinks, XML tags, and custom shorthand notes. Data about the item in the catalog entry, including the description of the item, may be unstructured or semi-structured natural language. For example, a catalog entry for a shirt may include a product name for the shirt, a text description of the shirt that may be the result of copywriting, and various measurements for the shirt. Catalog entries may be received individually or along with an entire catalog. For example, an entire catalog may be received initially, and additions or updates to the catalog may be received as individual catalog entries.

A list of categories that are to be used to categorize the items in a catalog entry may be received along with the catalog entry. The list of categories may be provided by, for example, a party responsible for selling the items in the catalog, or a party that maintains a website on which the items in the catalog will be sold. The list of categories may, for example, be received along with the catalog. The categories may be related to the type of items in the catalog. For example, categories that may be used categorize clothing items may include top, bottom, undergarment, accessory, or sock, glove, belt, causal, business, dress, solid, patterned, long-sleeve, short-sleeve, pants, shorts, skirt, dress, non-iron, spread collar, medium collar, tab collar, and other categories that may be used to categorize clothing items. A single item may belong to any number of categories, and categories may overlap, including categories that may be sub-categories of other categories. The list of categories may include any number of categories. The categories in the list of categories may have been determined in any suitable manner, including, for example, by human review.

A catalog entry may be pre-processed before being input to a machine learning model. Words in the text of a catalog entry, such as a name and description of the item, may be used to generate a textual description of the item. The words in the text of the catalog entry may be compared to existing vocabularies of words and part-of-speech tagging may be applied to the words. This may tokenize all known words in the catalog entry so that the textual description may be free from noise in the catalog entry such as WL, hyperlinks, and custom shorthand.

The textual description generated from the catalog entry may be used to generate a feature vector. The feature vector may be generated in any suitable manner. For example, the feature vector may be generated by applying any combination of token frequency feature creation, term frequency-inverse document frequency (TF-IDF) feature creation, and pre-trained word embeddings to the textual description. The feature vector generated for a catalog entry may be stored along with the catalog entry, or otherwise associated with the catalog entry.

A portion of the feature vectors generated from catalog entries from a catalog may be part of a training data set for that catalog. Catalog entries with feature vectors in the training data set may be labeled with categories by, for example, a human categorizer. For a catalog entry with a feature vector that is part of the training data set, the human categorizer may select categories that the item in the catalog entry belongs to from the list of categories for the catalog. These categories may be the selected categories for the catalog entry, and may be stored in any suitable format for use with machine learning models. For example, the selection of categories for a catalog entry may be stored as a vector with an element for each category from the list of categories, with elements for categories that were selected for the item in the catalog entry being marked, for example, with, a "1". Feature vectors for catalog entries that are part of the training data set for a catalog may be stored along with the selected categories for the catalog entries used to generate the feature vectors. The feature vectors in the training data set may be divided into two portions, a training data portion and validation data portion. Catalog entries with feature vectors that are not part of the training data set may be part of the live data set for the catalog.

Machine learning models may be trained to select categories with which to label items from catalog entries. The training data set for a catalog may be used to train any number of machine learning models of any suitable type. The machine learning models may be, for example, Bayesian classifiers, ensemble classification trees, and recurrent neural networks. The feature vector for a catalog entry from the training data portion of the training data set may be input to the machine learning models. The machine learning models may be configured with the list of categories for the catalog. The machine learning models may each output the probabilities that the item in the catalog entry belongs to any category in the list of categories for the catalog. The probabilities output by the machine learning models based on a catalog entry's feature vector may be compared to the selected categories for that catalog entry to determine the error of each of the machine learning models. Each machine learning model's errors may be used to train that machine learning model in a manner suitable to that machine learning model, such as, for example, through backpropagation for recurrent neural networks. The training of the machine learning models may continue for any suitable period of time and may use any number of feature vectors from the training data portion of the training data set. For example, the machine learning models may be trained for an hour, or may be trained on a set number of catalog entries from the training data portion of the training data set.

After the machine learning models have been trained for some period of time or using some number of feature vectors, the machine learning models may be tested using feature vectors from catalog entries in the validation data portion of the training data set. The feature vectors for catalog entries from the validation data portion of the training data set may be input to the machine learning models. The machine learning models may each output the probabilities that the items in the catalog entries belong to any category in the list of categories for the catalog. The probabilities output by the machine learning models based on a catalog entries' feature vectors may be compared to the selected categories for those catalog entries to determine the error of each of the machine learning models. Some percentage of the machine learning models with the most error may be discarded, and the remaining machine learning models may be kept. For example, the 70% of the machine learning models with the most error may be discarded, while the 30% of the machine learning models with the least error may be kept. The machine learning models that are kept after testing may undergo additional cycles of training and testing. New machine learning models may also be added to be trained, replacing the discarded machine learning models.

After any suitable number of cycles of training and testing, the machine learning models that were kept after the most recent testing may be used to label items in the catalog entries of the live data set. The feature vectors for catalog entries from the live data set may be input to the machine learning models. The machine learning models may each output the probabilities that the items in the catalog entries belong to the categories in the list of categories for the catalog. The probabilities output by the machine learning models based on a catalog entry's feature vector may be used to label the item in the catalog entry in any suitable manner. For example, an item may be labeled with all the categories that were assigned a probability at or above some threshold by a plurality of the machine learning models. For example, if three out of five machine learning models assign a probability above 80% to the category of "shirt" based on a feature vector, the product in that feature vector's catalog entry may be labeled as a "shirt." An item may be labeled using the category probabilities output by the best performing of the machine learning models, as determined during the testing of the machine learning models with the validation data. The probabilities output by the different machine learning models for the same category may, for example, be averaged or combined in any other suitable manner, and compared to the threshold for that category. An item from a catalog entry may be labeled with any number of categories from the list of categories for that catalog entry's catalog. The categories used to label an item may be stored in, or along with, the catalog entry for the item. The categories may be stored in any suitable format, and may be used in any suitable manner. For example, the categories may be used by a search engine when determining if the item in the catalog entry is responsive to a submitted search. The categories may also be used to index items in catalog, for example, allowing for the catalog to be browsed by categories, or for search results to be filtered by category.

The catalog may be continually updated through the addition, removal, and editing of catalog entries. As the catalog is updated, the training data set may also be updated with additional catalog entries that have been labeled with categories that may have been for example, selected by a human. The machine learning models that have been kept may undergo additional cycles of training and testing with the updated training data set. This may be repeated as the catalog is updated. The machine learning models may be cycled through training, testing, and labeling items from the live data set at any suitable intervals. In some implementations, feature vectors from catalog entries in the live data set may be interspersed with feature vectors from the training data set as input to the machine learning models.

Different sets of machine learning models may be trained to select categories used to label catalog entries from different catalogs. For example, the machine learning models trained on catalog entries from a first catalog may be separate from machine learning models trained on catalog entries from a second catalog. The first catalog and second catalog may have different lists of categories, which may necessitate the use of separate machine learning models. For example, a catalog that includes catalog entries for items of clothing may have a different list of categories than a catalog that includes catalog entries for electronics.

FIG. 1 shows an example system for multi-label product categorization according to an implementation of the disclosed subject matter. A computing device 100 may be any suitable computing device, such as, for example, a computer 20 as described in FIG. 10, or component thereof, for multi-label product categorization. The computing device 100 may include a data pre-processor 110, machine learning models 120, an evaluator 130, and a storage 140. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The data pre-processor 110 may be any suitable combination of hardware and software of the computing device 100 for pre-processing data, such as, for example, a catalog entry, to prepare that data to be input to the machine learning models 120. The data pre-processor 110 may, for example, generate a textual description from a catalog entry by comparing words in the catalog entry to existing vocabularies of words and applying part-of-speech tagging to the words in the description in the catalog entry. The data pre-processor may generate a feature vector from the textual description of a catalog entry by applying any combination of suitable types of feature creation, such as, for example, token frequency feature creation, term frequency-inverse document frequency (TF-IDF) feature creation, and pre-trained word embeddings, to the textual description. The data pre-processor 110 may store feature vectors generated from catalog entries in the storage 140, for example, as part oft training data set 150 or the live data set 152. For example, if a catalog entry is received along with selected categories for that catalog entry, the data pre-processor may store the feature vector for that catalog as part of the training data set 150 along with the selected categories. Otherwise, the data pre-processor 110 may store a feature vector as part of the live data set 152.

The machine learning models 120 may be any suitable combination of hardware and software for implementing machine learning models that may be trained, and used, to label items with categories. The machine learning models 120 may include, for example, recurrent neural networks, Bayesian classifiers, and ensemble classification trees. The machine learning models 120 may use any form of supervised learning, such as, for example, backpropagation for recurrent neural networks. The machine learning models 120 may be configured with a list of categories for a catalog. The machine learning models 120 may be trained, for example, using the training data set 150, to determine categories for labeling an item. The machine learning models 120 may be tested after training, and low-performing machine learning models may be discarded. New machine learning models may be added to the machine learning models 120 to replace machine learning models that have been discarded. The machine learning models 120 may be used to determine categories for labeling items in catalog entries from catalogs using the live data set 152.

The evaluator 130 may be any suitable combination of hardware and software of the computing device 100 for evaluating the performance of the machine learning models 120 and discarding low-performing machine learning models. After the machine learning models 120 are tested using validation data from the training data set 150, errors determined for the machine learning models 120 may be input the evaluator 130. The evaluator 130 may rank the machine learning models based on their level of error and may discard some percentage of the machine learning models with the highest level of error.

The storage 140 may be any suitable combination of hardware and software for storing data. The storage 140 may include any suitable combination of volatile and non-volatile storage hardware, and may include components of the computing device 100 and hardware accessible to the computing device 100, for example, through wired and wireless direct or network connections. The storage 140 may store the training data set 150, the live data set 152, and labeled catalog entries 154.

Figure 2A:
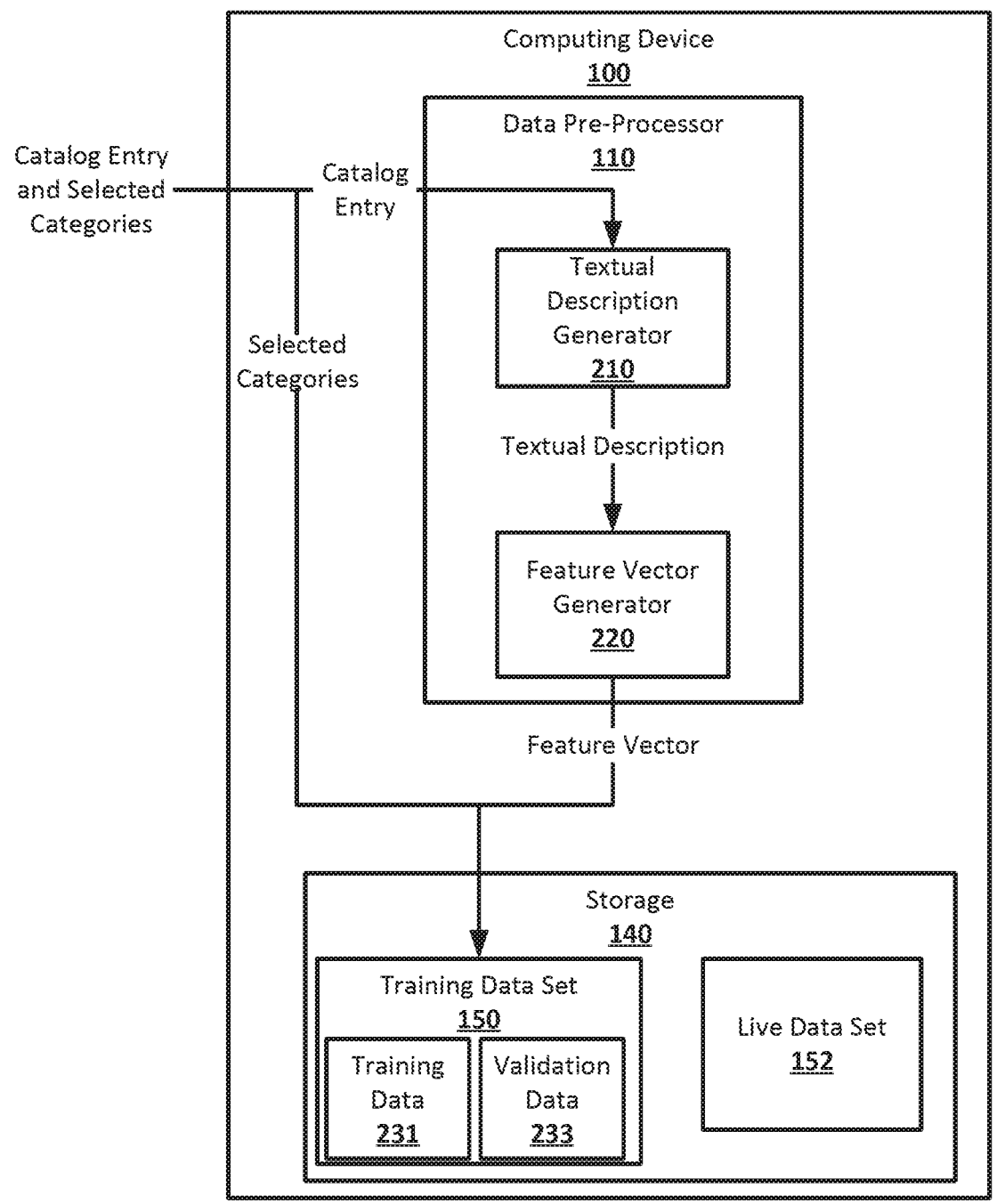
FIG. 2A shows an example arrangement for multi-label product categorization according to an implementation of the disclosed subject matter.

FIG. 2A shows an example arrangement for multi-label product categorization according to an implementation of the disclosed subject matter. The data pre-processor 110 may receive a catalog entry and selected categories. The catalog entry may be an entry for an item from a catalog, and may include text describing the item, such as, for example, a name or title for the item, a natural language description of the item, and other descriptive text for the item. For example, the item may be a shirt, and the catalog entry for the shirt may include a name that may be used to identify the shirt, a text description of the shirt, text including fit, sizing and color information for the shirt, and any other suitable information about the shirt. The selected categories may be categories selected as labels for the item in the catalog entry by, for example, a human. The categories may be selected from a list of categories for the catalog. The catalog entry may be received from any suitable source, such as, for example, from storage directly accessible to the computing device 100, such as the storage 140, or from another computing device or system. For example, the computing device 100 may be, or be part of, a server system for an e-commerce system, and the catalog entry may be received as a part of a catalog uploaded to the e-commerce system by a party that wishes to sell items in the catalog through the e-commerce system. The computing device 100 may also be separate from an e-commerce system, and may receive catalog entries through catalogs uploaded to the computing device 100 by parties that operate their own e-commerce system or utilize some other e-commerce system.

A textual description generator 210 may be any suitable combination of hardware and software that may be part of the data pre-processor 110 for generating a textual description from a catalog entry. The textual description generator 210 may, for example, receive a catalog entry and may compare the words in the catalog entry, including the name and description of the item, to existing vocabularies of words and may apply part-of-speech tagging to the words in the description in the catalog entry. This may tokenize all known words in the catalog entry so that the textual description may be free from noise in the catalog entry such as XML, hyperlinks, and custom shorthand.

A feature vector generator 220 may be any suitable combination of hardware and software that may be part of the data pre-processor 110 for generating a feature vector from a textual description. The feature vector generator 220 may, for example, apply any combination of token frequency feature creation, term frequency-inverse document frequency (TF-IDF) feature creation, and pre-trained word embeddings to the textual description received from the textual description generator 210 to generate a feature vector from the textual description.

The feature vector generated by the feature vector generator 220 may be stored as part of the training data set 150 in the storage 140. The feature vector may be stored along with the selected categories that were received with the catalog entry input to the data pre-processor 110. The catalog entry may also be stored in the training data set 150 with its feature vector, or may otherwise be associated with the feature vector. The feature vector and selected categories may be stored in either the training data portion 231 or the validation data portion 233 of the training data set 150. The training data portion 231 may including feature vectors and selected categories used to train the machine learning models 120, while the validation data portion 233 may include feature vectors and selected categories used to test the machine learning models 120 to determine which machine learning models to discard. Feature vectors may be assigned to either the training data portion 231 or the validation data portion 233 when the feature vectors are added to the training data set 150, while the machine learning models 120 are being trained and tested, or at any other suitable time.

The data pre-processor 110 may receive any suitable number of catalog entries with selected categories. For each received catalog entry with selected categories, the data pre-processor 110 may generate a feature vector to store in the training data set 150.

Figure 2B:
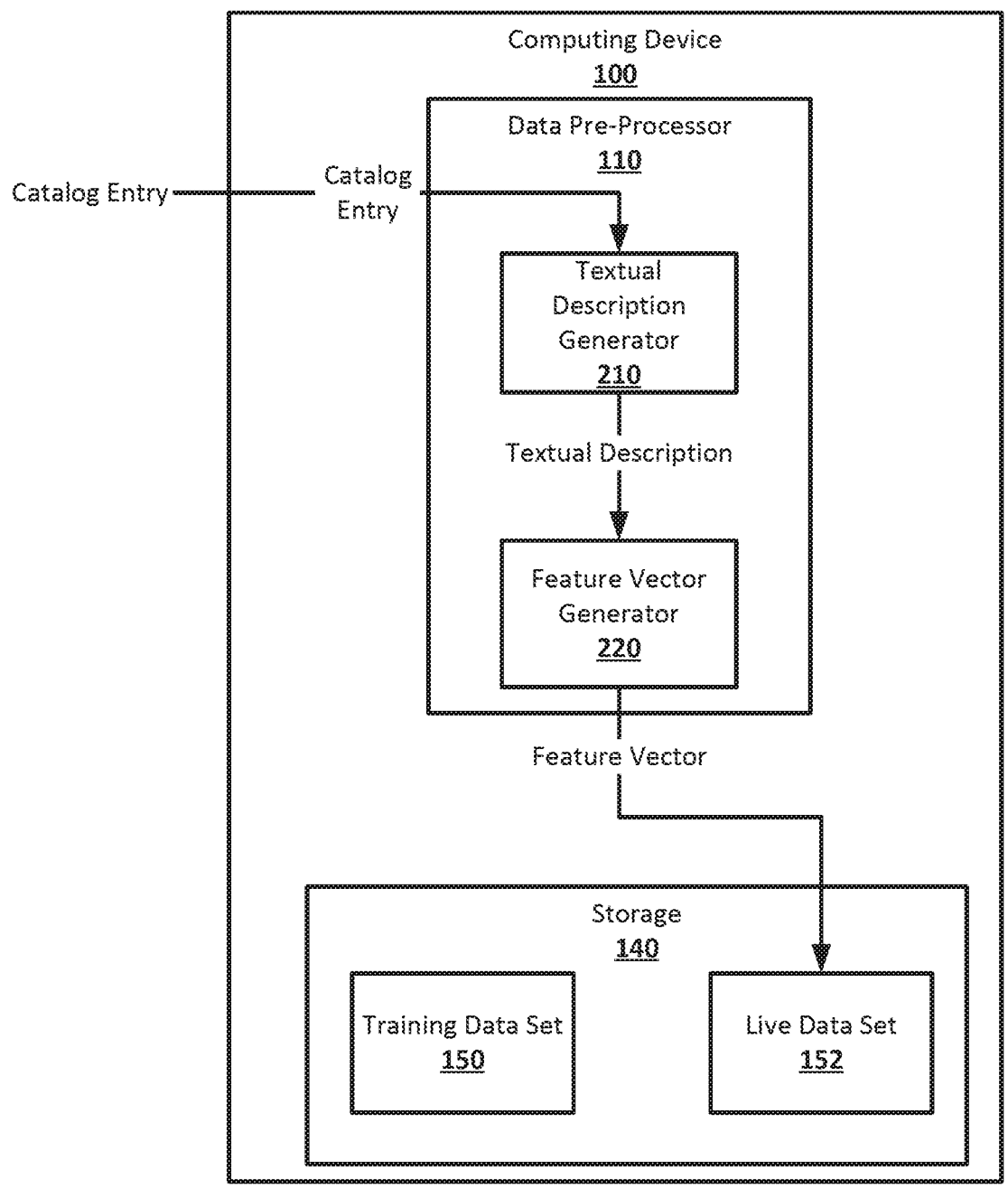
FIG. 2B shows an example arrangement for multi-label product categorization according to an implementation of the disclosed subject matter.

FIG. 2B shows an example arrangement for multi-label product categorization according to an implementation of the disclosed subject matter. The data pre-processor 110 may receive a catalog entry without any selected categories. The catalog entry may be an entry for an item from the same catalog as the catalog entries that were received with selected categories. The catalog entry may be received from any suitable source, such as the same source from which the catalog entries with selected were received.

The textual description generator 210 may receive the catalog entry and may compare the words in the catalog entry, including the name and description of the item, to existing vocabularies of words and may apply part-of-speech tagging to the words in the description in the catalog entry, generating a textual description. This may tokenize all known words in the catalog entry so that the textual description may be free from noise in the catalog entry such as XML, hyperlinks, and custom shorthand.

The feature vector generator 220 may apply any combination of token frequency feature creation, term frequency-inverse document frequency (TF-IDF) feature creation, pre-trained word embeddings, and any other type of feature creation to the textual description received from the textual description generator 210 to generate a feature vector.

The feature vector generated by the feature vector generator 220 from the catalog entry that was received without selected categories may be stored as part of the live data set 152 in the database 145. The catalog entry may also be stored in the live data set 152 with its feature vector, or may otherwise be associated with the feature vector. The live data set 152 may include feature vectors for catalog entries that will have their items labeled with categories by the machine learning models 120 and will not be used for training the machine learning models 120.

Figure 3:
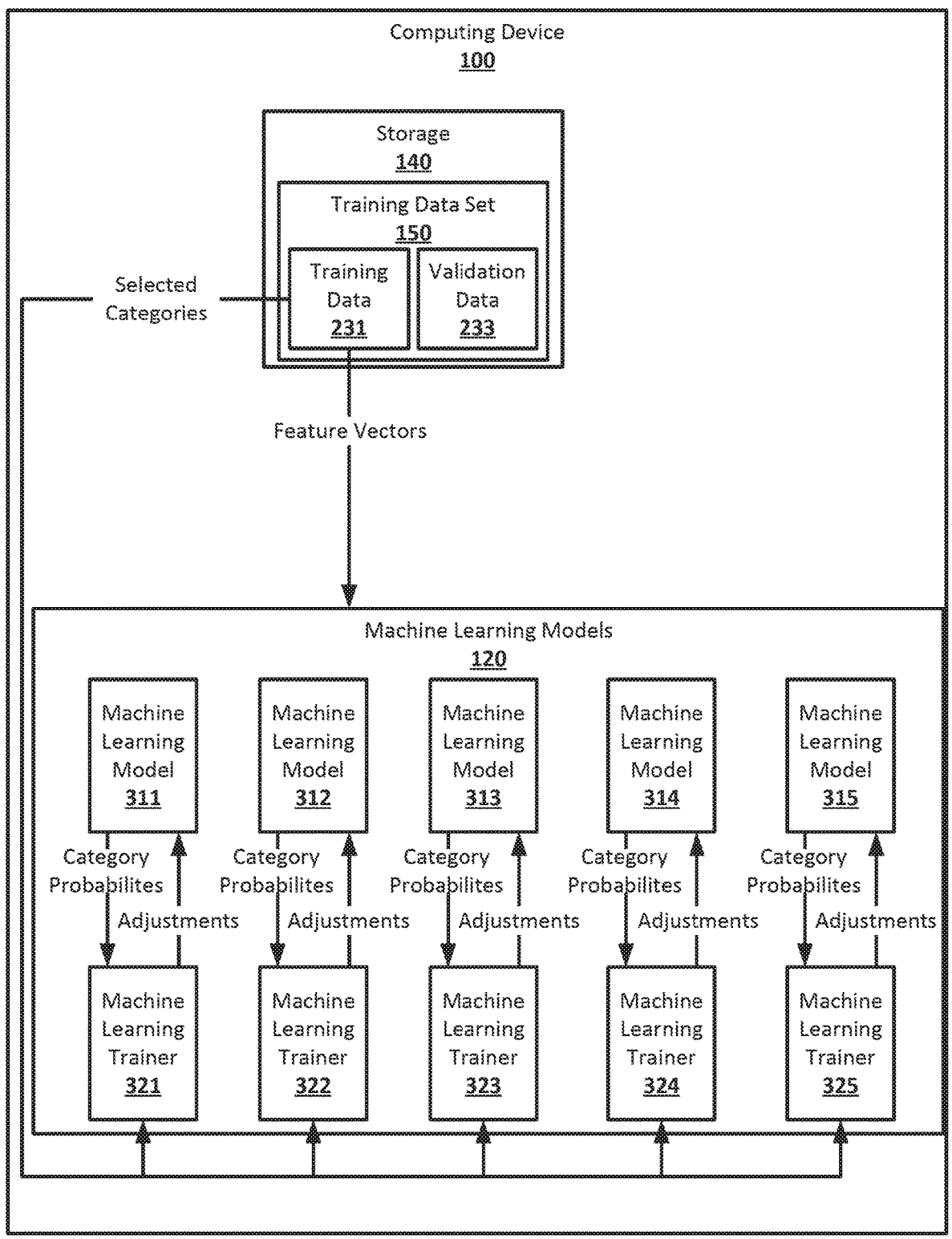
FIG. 3 shows an example arrangement for multi-label product categorization according to an implementation of the disclosed subject matter.

FIG. 3 shows an example arrangement for multi-label product categorization according to an implementation of the disclosed subject matter. The training data set 150 may be used to train the machine learning models 120. The machine learning models 120 may include, for example, machine learning model 311, machine learning model 312, machine learning model 313, machine learning model 314, and machine learning model 315, with corresponding machine learning trainer 321, machine learning trainer 322, machine learning trainer 323, machine learning trainer 324, and machine learning trainer 325. The machine learning trainers may include any suitable combination of hardware and software for training the machine learning models 120.

Feature vectors from the training data portion 231 of the training data set 150 may be received by the machine learning models 120 from the storage 140. The feature vectors may be input to the machine learning models 120, for example, the machine learning model 311, the machine learning model 312, the machine learning model 313, the machine learning model 314, and the machine learning model 315, which may output category probabilities. The category probabilities output from one of the machine learning models 120 based on the input of a feature vector may be a set of probabilities that the item in the catalog entry used to generate the feature vector belongs to categories from the list of categories for the catalog as determined by that one of the machine learning models 120. The category probabilities output by different ones of the machine learning models 120 based on the same feature vector may differ.

Each of the machine learning models 120 may output category probabilities determined based on a feature vector to the machine learning model's corresponding machine learning trainer. For example, the machine learning model 311 may output category probabilities to the machine learning trainer 321. The machine learning trainers may receive the selected categories from the training data 231 for the feature vectors received by the machine learning models 120. The machine learning trainers may compare the category probabilities output by the machine learning models 120 based on a feature vector to the selected categories for that feature vector to determine errors of the machine learning models 120. For example, the machine learning trainer 321 may compare the category probabilities output by the machine learning model 311 based on an input feature vector to the selected categories for that feature vector to determine an error of the machine learning trainer 321. Error of the machine learning models 120 may be determined in any suitable manner, and may be based on the type of machine learning model the error is determined for.

The errors of the machine learning models 120 may be used to train the machine learning models 120. For example, the machine learning trainer 321 may use the errors of the machine learning model 311, which may be a recurrent neural network, with backpropagation to determine and apply adjustments to weights between the various layers of the recurrent neural network of the machine learning model 311. Each of the machine learning models 120, for example, the machine learning model 311, machine learning model 312, machine learning model 313, machine learning model 314, and machine learning model 315 may have its error determined and be adjusted, based on its machine learning model type, by its corresponding machine learning trainer, for example, the machine learning trainer 321, machine learning trainer 322, machine learning trainer 323, machine learning trainer 324, and machine learning trainer 325.

Any suitable number of feature vectors from the training data portion 231 of the training data set 150 may be used as inputs to the machine learning models 120 to train the machine learning models 120, and the same inputs may be used any number of times. The training of the machine learning models 120 may continue for a set amount of time, a set number of inputs of feature vectors, or until some number of the machine learning models 120 have achieved a target level of error across a number of inputs from the training data portion 231 of the training data set 150. The feature vectors used as inputs to the machine learning models 120 during training may be selected from the training data portion 231 of the training data set 150 in any suitable manner, such as, for example, randomly.

Figure 4A:
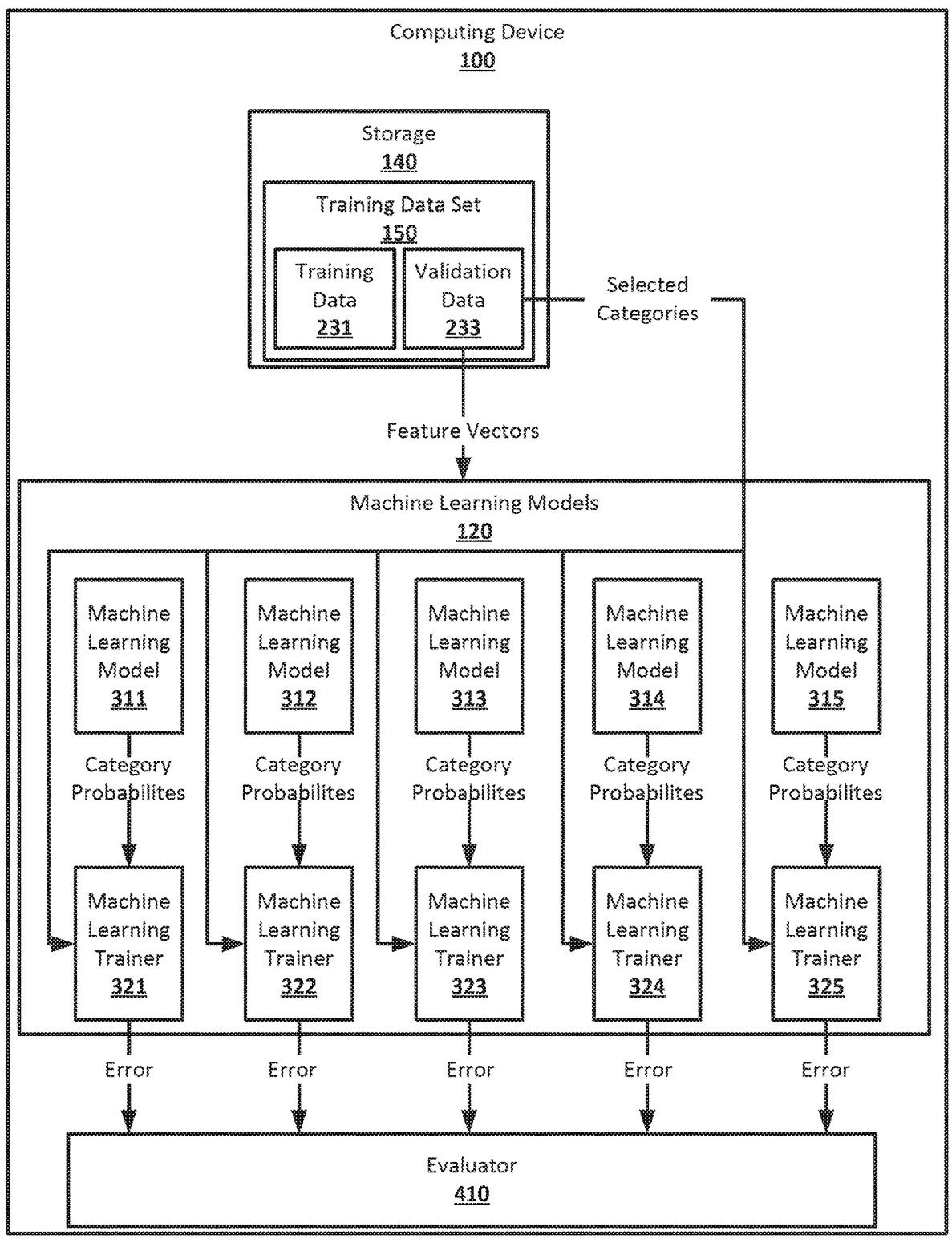
FIG. 4A shows an example arrangement for multi-label product categorization according to an implementation of the disclosed subject matter.

FIG. 4A shows an example arrangement for multi-label product categorization according to an implementation of the disclosed subject matter. The validation data portion 233 of the training data set 150 may be used to test the machine learning models 120 after training, for example, to determine which of the machine learning models 120 have the lowest error in generating category probabilities for items in catalog entries based on feature vectors generated from the catalog entries. Feature vectors from the validation data portion 233 of the training data set 150 may be input to the machine learning models 120, for example, the machine learning model 311, the machine learning model 312, the machine learning model 313, the machine learning model 314, and the machine learning model 315, which may output category probabilities. The category probabilities output from one of the machine learning models 120 based on the input of a feature vector may be a set of probabilities that the item in the catalog entry used to generate the feature vector belongs to categories from the list of categories for the catalog as determined by that one of the machine learning models 120.

Each of the machine learning models 120 may output category probabilities determined based on a feature vector to the machine learning model's corresponding machine learning trainer. For example, the machine learning model 311 may output category probabilities to the machine learning trainer 321. The machine learning trainers may receive the selected categories from the validation data 233 for the feature vectors received by the machine learning models 120. The machine learning trainers may compare the category probabilities output by the machine learning models 120 based on a feature vector to the selected categories for that feature vector to determine errors of the machine learning models 120. For example, machine learning trainer 321 may compare the category probabilities output by the machine learning model 311 based on an input feature vector to the selected categories for that feature vector to determine an error of the machine learning trainer 321. Any number of feature vectors from the validation data portion 233 of the training data set 150 may be input to the machine learning models 120.

Some percentage of the machine learning models 120 with the most error may be discarded, and the remaining machine learning models 120 may be kept. For example, the 70% of the machine learning models 120 with the most error may be discarded, while 30% of the machine learning models 120 with the least error may be kept. For example, the errors determined by the machine learning trainers, for example, the machine learning trainer 321, machine learning trainer 322, machine learning trainer 323, machine learning trainer 324, and machine learning trainer 325, for the feature vectors input to the machine learning models 120 may be received at an evaluator 410. The evaluator 410 may be any suitable combination of hardware and software for using the errors of the machine learning models 120 to rank or otherwise compare the performance of the machine learning models to each other in any suitable manner. For example, the evaluator 410 may create a list of the machine learning models 120 sorted by the error of the machine learning models 120 based on, for example, the average error across all of the feature vectors from the validation data portion 233 input to the machine learning models 120.

Figure 4B:
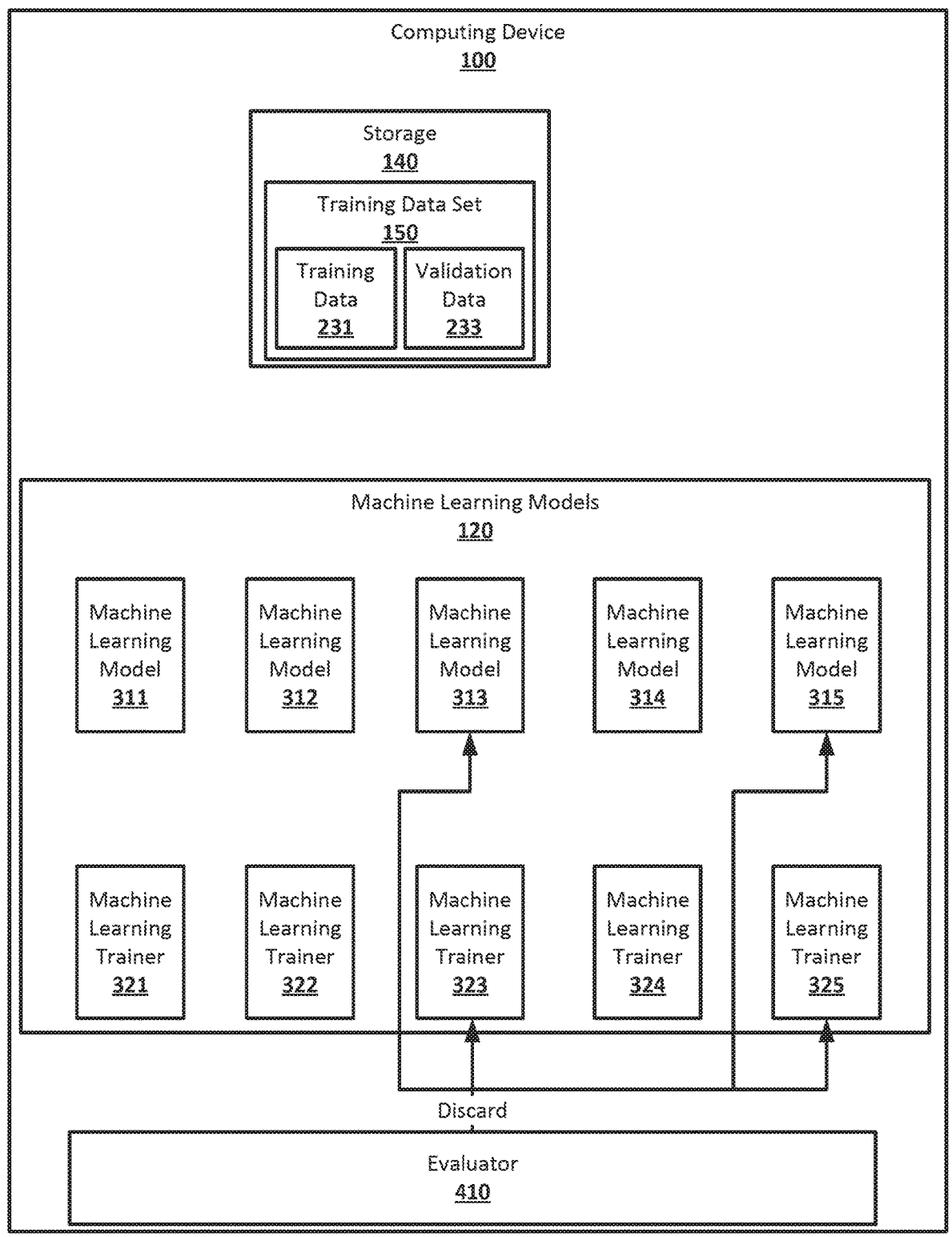
FIG. 4B shows an example arrangement for multi-label product categorization according to an implementation of the disclosed subject matter.

FIG. 4B shows an example arrangement for multi-label product categorization according to an implementation of the disclosed subject matter. The evaluator 410 may determine which of the machine learning models 120 are the lowest performing based on the errors in the category probabilities output by the machine learning models 120 for the feature vectors from the validation data portion 233 of the training data set 150. The evaluator 410 may discard some percentage of the lower performing of the machine learning models 130. For example, the machine learning model 313 and the machine learning model 315 may be the lowest performing of the machine learning models 120, for example, having the most average error. The evaluator 410 may discard the lowest performing 40% of the machine learning models 120, for example, the machine learning model 313 and the machine learning model 315, and the corresponding machine learning trainer 323 and machine learning trainer 325.

Figure 4C:
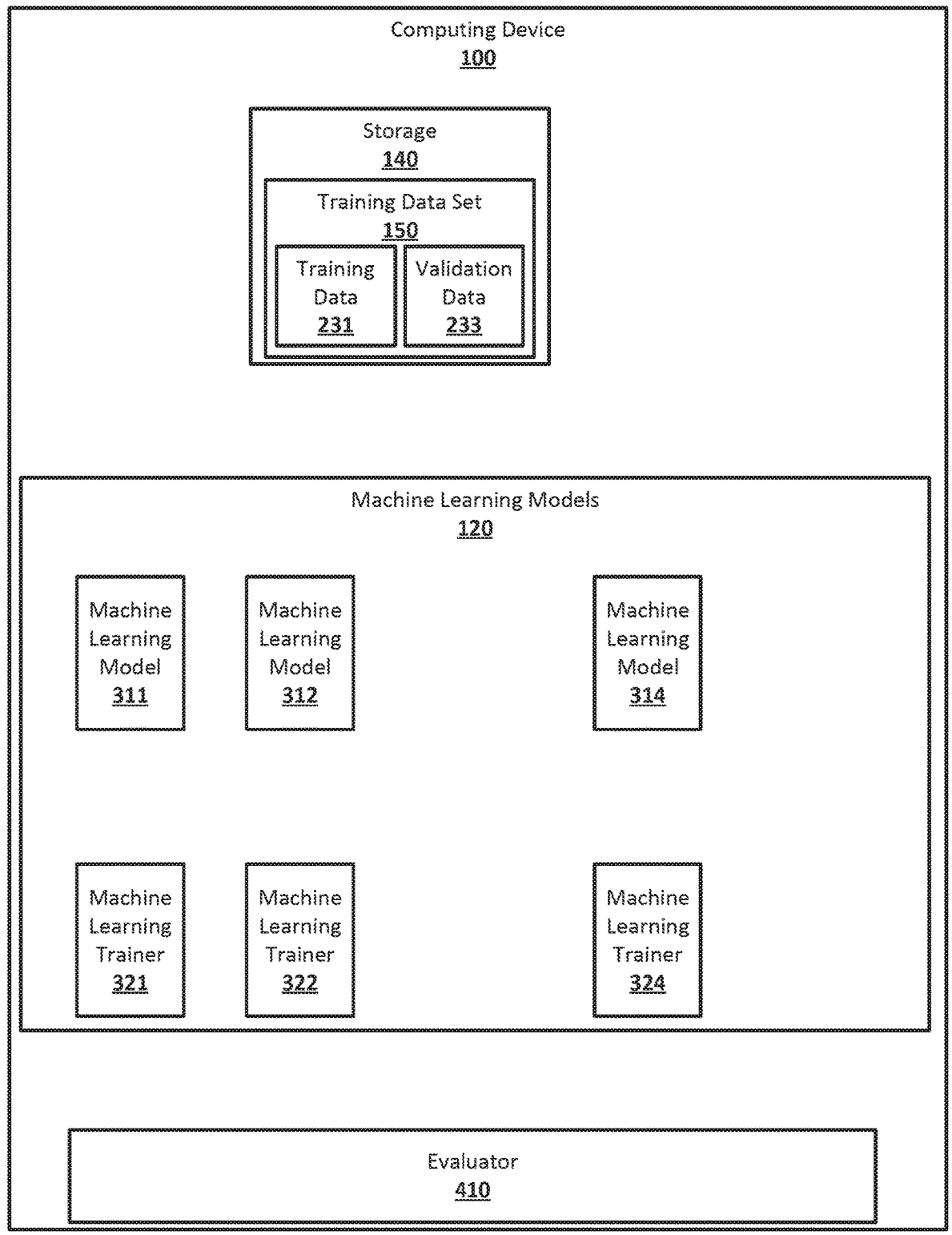
FIG. 4C shows an example arrangement for multi-label product categorization according to an implementation of the disclosed subject matter.

FIG. 4C shows an example arrangement for multi-label product categorization according to an implementation of the disclosed subject matter. The lowest performing of the machine learning models 120 may be discarded from the machine learning models 120. For example, the machine learning model 313 and the machine learning model 315, and the corresponding machine learning trainer 323 and machine learning trainer 325, may be discarded from the machine learning models 120. This may, for example, leave the machine learning model 311, the machine learning model 312, and the machine learning model 314 as the machine learning models 120. New machine learning models may be added to the machine learning models 120 at any time, for example, to take the place of discarded machine learning models, or to add to the total number of machine learning models in the machine learning models 120.

The machine learning models 120 may be trained and tested, with low performing machine learning models being discarded, at any suitable times and intervals. For example, the machine learning models 120 may be trained whenever some number of new or updated catalog entries are received at the computing device 100, resulting in some number of new feature vectors being added to the training data set 150. The machine learning models 120 may also be trained when, for example, the list of categories for the catalog is updated and updated selected categories, reflecting the changes to the list of categories, are received for catalog entries with feature vectors that are in the training data set 150.

Figure 5:
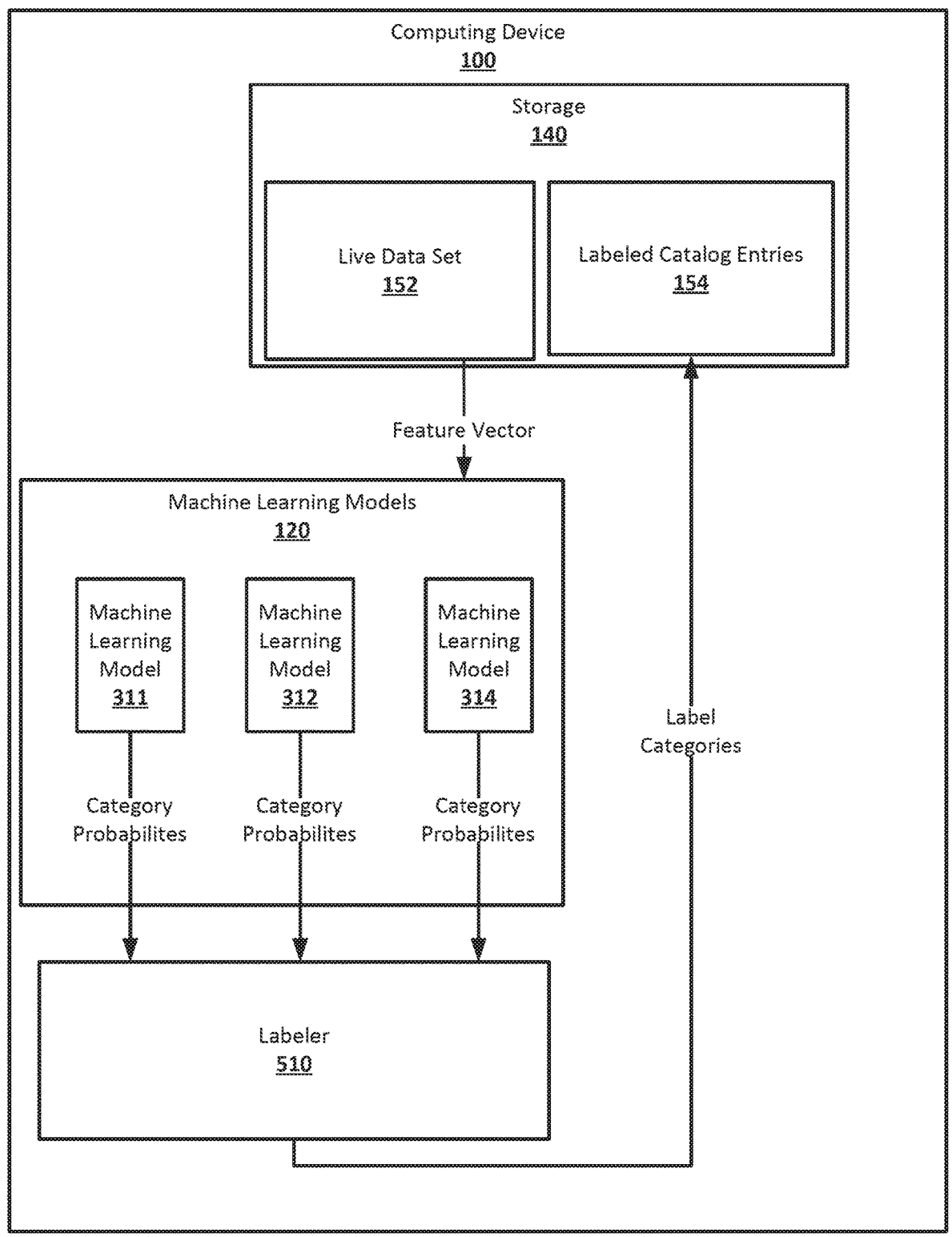
FIG. 5 shows an example arrangement suitable for multi-label product categorization according to an implementation of the disclosed subject matter.

FIG. 5 shows an example arrangement for multi-label product categorization according to an implementation of the disclosed subject matter. The machine learning models 120 may be used to generate labels for items in catalog entries. Feature vectors from the live data set 152 may be input to the machine learning models 120. For example, after training and testing, the machine learning models 120 may include the machine learning model 311, the machine learning model 312, and the machine learning model 314, which may receive feature vectors from the live data set 152 as input.

Each of the machine learning models 120 may output category probabilities determined based on a feature vector input from the live data set 152. The category probabilities may be received by a labeler 510. The labeler 510 may be any suitable combination of hardware and software for determining label categories for an item in a catalog entry based on category probabilities output by machine learning models that received a feature vector for the catalog entry as input. For example, the labeler 510 may receive the category probabilities output by the machine learning model 311, the machine learning model 312, and the machine learning model 314 from an input feature vector and determine the label categories that may be used to label the item in the catalog entry that the feature vector was generated from. The labeler 510 may determine the label categories in any suitable manner. For example, the labeler 510 may average the probabilities for each category across the category probabilities output from the machine learning models 120, and may add a category to the label categories if the average is above some threshold. The labeler 510 may only use the category probabilities output by the machine learning model that had the highest performance, for example, least error, as determined by the evaluator 410. The labeler 510 may determine which categories have a category probability above a threshold among a plurality of the different sets of category probabilities. The label categories output by the labeler 510 may be added to the catalog entry for the feature vector in the labeled catalog entries 154. The labeled catalog entries 154 may be catalog entries with an item that has been labeled with categories from the list of categories by the machine learning models 120 and the labeler 510.

The machine learning models 120 may receive feature vectors from the live data set 152 for any suitable period of time before again being trained and tested using feature vectors from the training data set 150. For example, the machine learning models 120 may receive some set number of feature vectors from the live data set 152, may receive feature vectors from the live data set 152 for a set amount of time, or until some number of new and updated catalog entries have been received, necessitating further training.

Figure 6:
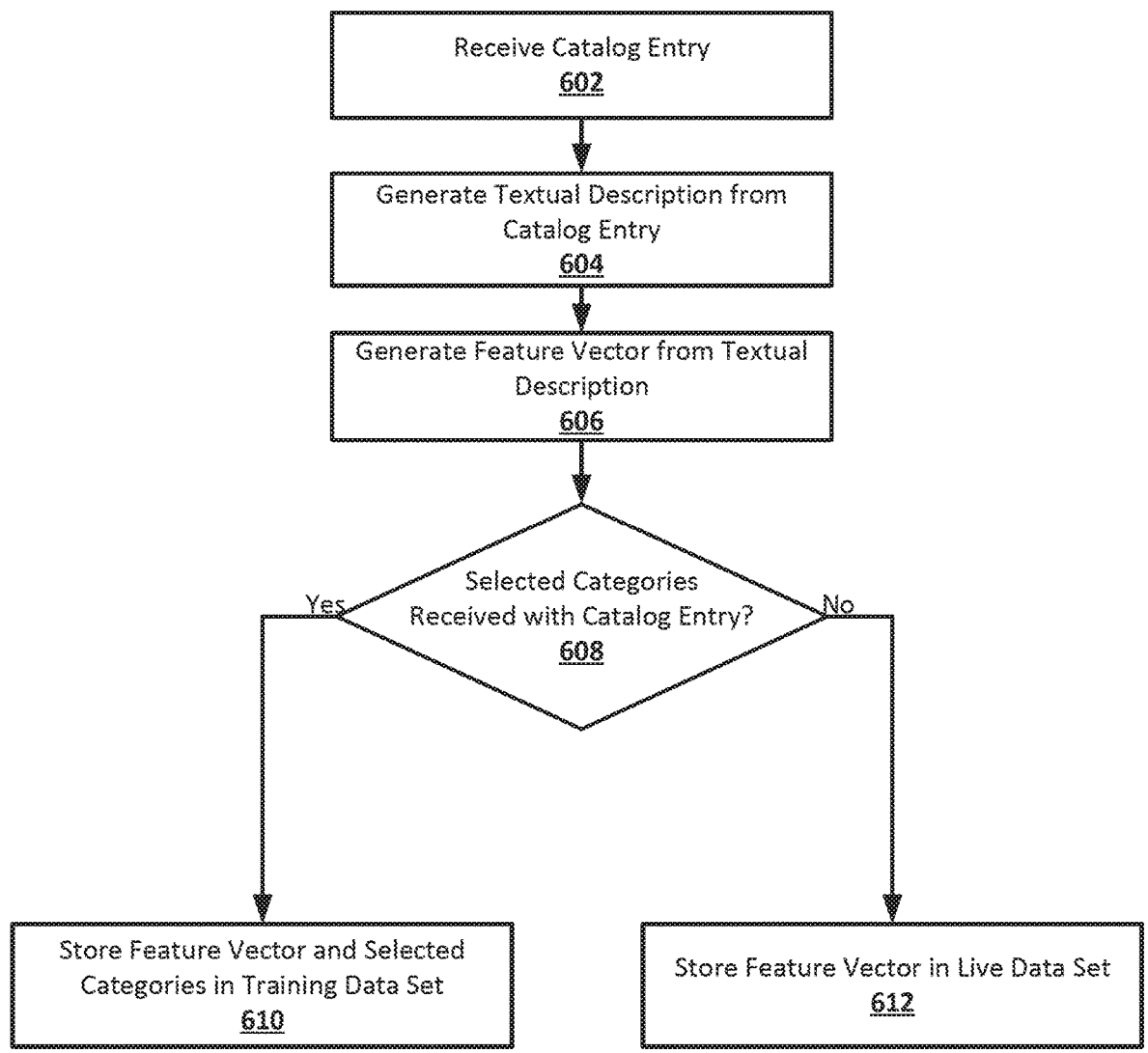
FIG. 6 shows an example procedure suitable for multi-label product categorization according to an implementation of the disclosed subject matter.

FIG. 6 shows an example procedure suitable for multi-label product categorization according to an implementation of the disclosed subject matter. At 602, a catalog entry may be received. For example, the data pre-processor 110 on the computing device 100 may receive a catalog entry from a catalog. The catalog entry may be received from any suitable source, and may be received individually, or may be received along with the rest of the catalog. The catalog entry may be accompanied by a list of categories for the catalog, if not already received at the computing device 100. If the catalog entry is meant to be part of the training data set 150, selected categories for the catalog entry may be received with the catalog entry. The selected categories may be categories selected from the list of categories for the catalog to label an item in the catalog entry. The selected categories may have been selected by, for example, a human.

At 604, a textual description may be generated from the catalog entry. For example, the catalog entry may be input to the textual description generator 210 of the data pre-processor 110. The textual description generator 210 may compare the words in the catalog entry, including the name and description of the item, to existing vocabularies of words and may apply part-of-speech tagging to the words in the description in the catalog entry. This may tokenize all known words in the catalog entry so that the textual description generated by the textual description generator 210 may be free from noise in the catalog entry such as XML, hyperlinks, and custom shorthand.

At 606, a feature vector may be generated from the textual description. For example, the textual description generated by the textual description generator 210 may be input to the feature vector generator 220 of the data pre-processor 110. The feature vector generator 220 may apply any combination of token frequency feature creation, term frequency-inverse document frequency (TF-IDF) feature creation, pre-trained word embeddings, and any other suitable forms of feature creation, to the textual description received from the textual description generator 210 to generate a feature vector. The feature vector may have any suitable format, and may be, for example, a vector with any suitable number of elements of any suitable type.

At 608, if selected categories were received with the catalog entry, flow may proceed to 610. Otherwise, flow may proceed to 612. Selected categories may be received with a catalog entry when the catalog entry is meant to be used to train the machine learning models 120. If a catalog entry is received without selected categories, this may indicate that the catalog entry is meant to have categories from the list of categories determined by the machine learning models 120 for labeling the item in the catalog entry.

At 610, the feature vector and selected categories may be stored in a training data set. For example, the feature vector generated by the feature vector generator 220 may be stored along with the selected categories received with the catalog entry as part of the training data set 150 in the storage 140. The catalog entry may also be stored with the feature vector and selected categories as part of the training data set 150, or may be stored separately. The feature vector may be stored as part of the training data portion 231 or the validation data portion 233 of the training data set 150. This may be determined at the time the feature vector is stored, or may be determined at a later time, for example, during the training of the machine learning models 120.

At 612, the feature vector may be stored in a live data set. For example, the feature vector generated by the feature vector generator 220 may be stored along as part of the live data set 152 in the storage 140. The catalog entry may also be stored with the feature vector and selected categories as part of the live data set 152, or may be stored separately.

Figure 7:
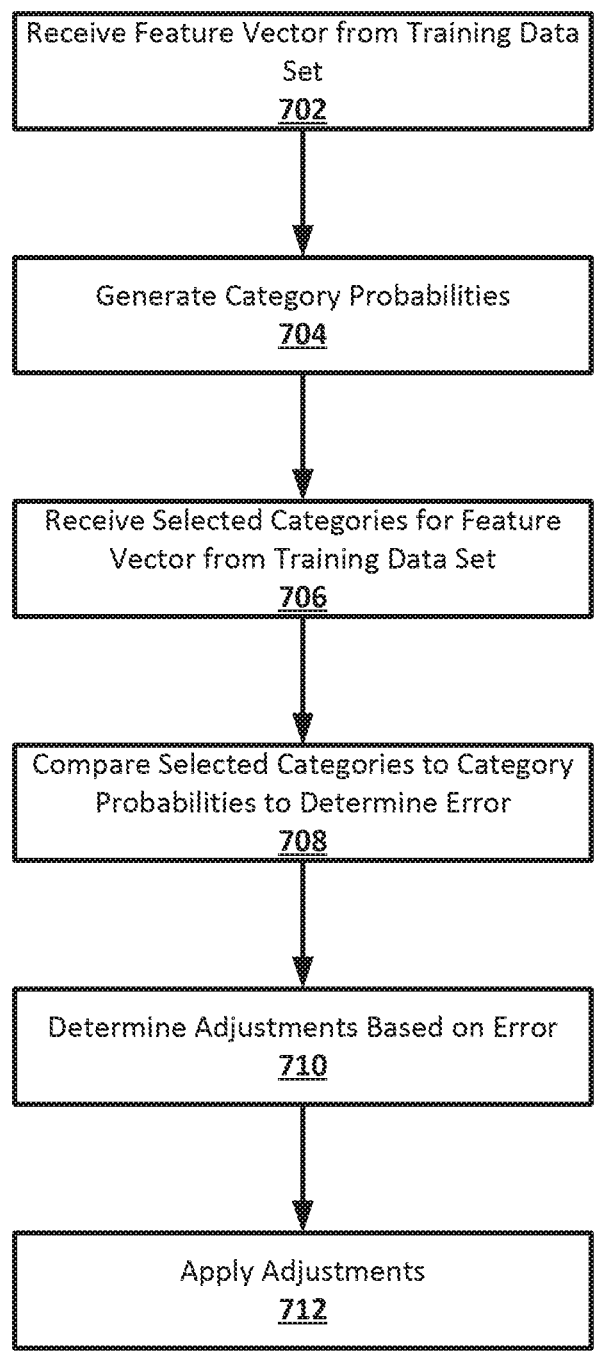
FIG. 7 shows an example procedure suitable for multi-label product categorization according to an implementation of the disclosed subject matter.

FIG. 7 shows an example procedure suitable for multi-label product categorization according to an implementation of the disclosed subject matter. At 702, a feature vector from a training data set may be received. For example, the machine learning models 120 may receive a feature vector from the training data portion 231 of the training data set 150. The feature vector may be selected in any suitable manner, including, for example, randomly, from the training data portion 231 of the training data set 150.

At 704, category probabilities may be generated. For example, the machine learning models 120 may be configured with the list of categories that were received at the computing device 100 along with the catalog entries that were used to generate the feature vectors in the training data set 150. The machine learning models 120 may output category probabilities, which may be sets of probabilities that the item in the catalog entry used to generate the feature vector belongs to categories from the list of categories for the catalog as determined by the machine learning models 120. Each of the machine learning models 120 that receives the feature vector as input may output its own category probabilities.

At 706, selected categories for the feature vector may be received from the training data set. For example, machine learning trainers that correspond to the various machine learning models 120, such as the machine learning trainers 321, machine learning trainers 322, machine learning trainers 323, machine learning trainers 324, and machine learning trainers 325, may receive the selected categories for the feature vector input to the machine learning models 120. The selected categories may have been received along with the catalog entry used to generate the feature vector, and may be a selection of categories, for example, from a human reviewer, with which to label the item in the catalog entry.

At 708, the selected categories may be compared to the selected categories to determine error. For example, machine learning trainers may receive the selected categories from the training data set 150 for the feature vector that was input to the machine learning models 120. The machine learning trainers may compare the selected categories to the category probabilities output by the machine learning models 120. The determined error may be based on how the category probabilities differ from the selected categories.

At 710, adjustments may be determined for machine learning models based on their errors. For example, each of the machine learning trainers may determine adjustments to its corresponding one of the machine learning models 120 based on the error that one of the machine learning models 120. The machine learning trainer 321 may, for example, determine adjustments for the machine learning model 311 based on the error determined by the machine learning trainer 321 from the category probabilities output by the machine learning model 311. The adjustments determined by the machine learning trainers may be specific to the type of machine learning model the adjustments are determined for. For example, adjustments for a machine learning model that is a recurrent neural network may be adjustments to the weights of the recurrent neural network.

At 712, adjustments may be applied to the machine learning models. For example, the machine learning trainers may adjust their corresponding machine learning models 120 based on the adjustments determined based on the error in the category probabilities output by the machine learning models 120. The machine learning trainer 321 may, for example, adjust the machine learning model 311 based on the adjustments determined for the machine learning model 311. The adjustments may be made in a manner specific to the type of machine learning model being adjusted. For example, the machine learning model 311 may be a recurrent neural network, and may be adjusted by having adjustments applied to its weight by the machine learning trainer 321.

Figure 8:
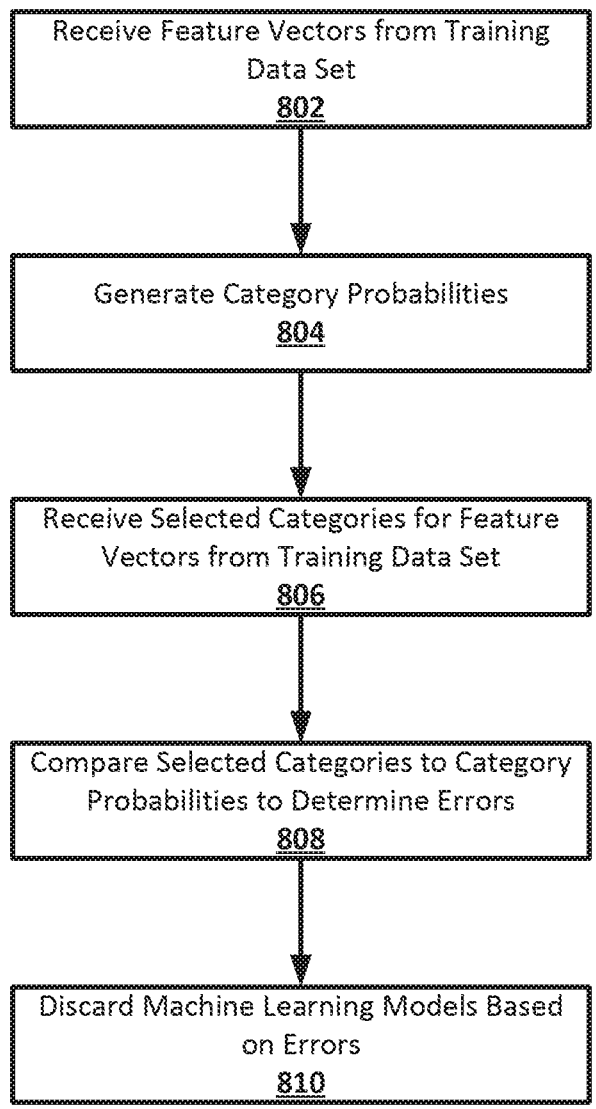
FIG. 8 shows an example procedure suitable for multi-label product categorization according to an implementation of the disclosed subject matter.

FIG. 8 shows an example procedure suitable for multi-label product categorization according to an implementation of the disclosed subject matter. At 802, feature vectors from a training data set may be received. For example, the machine learning models 120 may receive feature vectors from the validation data portion 233 of the training data set 150. Any number of the feature vectors from the validation data portion 233 of the training data set 150 may be received by the machine learning models 120.

At 804, category probabilities may be generated. For example, the machine learning models 120 may be configured with the list of categories that were received at the computing device 100 along with the catalog entries that were used to generate the feature vectors in the training data set 150. The machine learning models 120 may output category probabilities which, may be sets of probabilities that the items in the catalog entries used to generate the feature vectors belong to categories from the list of categories for the catalog as determined by the machine learning models 120. Each of the machine learning models 120 that receives the feature vectors as input may output its own category probabilities.

At 806, selected categories for the feature vectors may be received from the training data set. For example, machine learning trainers that correspond to the various machine learning models 120, such as the machine learning trainers 321, machine learning trainers 322, machine learning trainers 323, machine learning trainers 324, and machine learning trainers 325, may receive the selected categories for the feature vectors input to the machine learning models 120. The selected categories may have been received along with the catalog entries used to generate the feature vectors, and may include categories selected by a human reviewer to label the items in the catalog entries.

At 808, the selected categories may be compared to the selected categories to determine errors. For example, machine learning trainers may receive the selected categories from the training data set 150 for the feature vectors that were input to the machine learning models 120. The machine learning trainers may compare the selected categories to the category probabilities output by the machine learning models 120. The determined errors may be based on how the category probabilities output for the feature vectors differ from the selected categories for the feature vectors.

At 810, machine learning models may be discarded based on the errors. For example, the evaluator 410 may receive the errors determined by the machine learning trainers for each feature vector input to the machine learning models 120. The errors may be combined per machine learning model to determine the overall performance of each of the machine learning models 120. For example, the errors for the machine learning model 311 across all of the feature vectors from the validation data set 233 input to the machine learning model 311 may be combined by the evaluator 410 to determine the performance of the machine learning model 311, for example, an overall error of the machine learning model 311. The evaluator 410 may compare the performances of the machine learning models 120 and may discard some number, for example, a percentage, of the lowest performing of the machine learning models 120. For example, the machine learning model 313 and the machine learning model 315 may be the lowest performing of the machine learning models 120, for example, having the greatest overall error. Discarded machine learning models may be removed from the machine learning models 120 and may not be used to label catalog entries that have feature vectors in the live data set 152. New machine learning models may be added to the machine learning models 120 to replace discarded machine learning models, or to increase the number of machine learning models.

Figure 9:
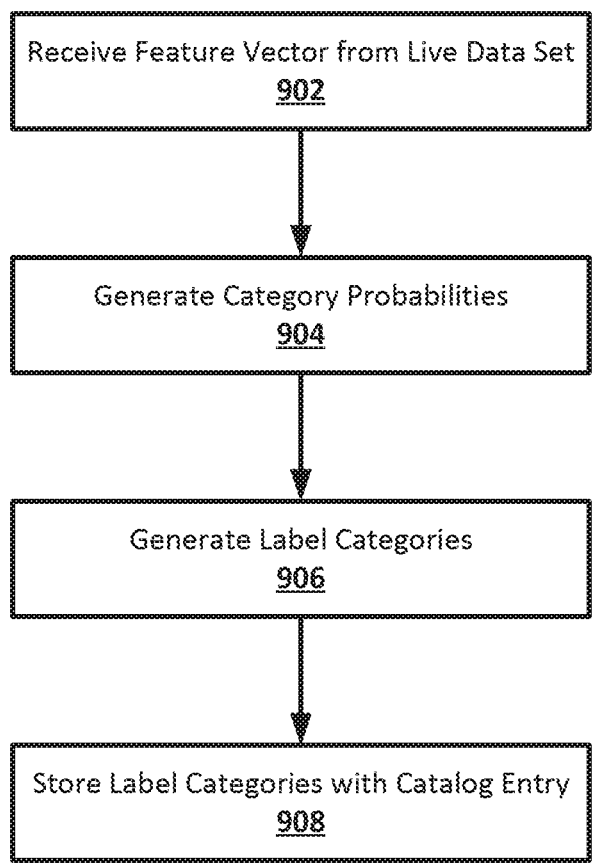
FIG. 9 shows an example procedure suitable for multi-label product categorization according to an implementation of the disclosed subject matter.

FIG. 9 shows an example procedure suitable for multi-label product categorization according to an implementation of the disclosed subject matter. At 902, a feature vector from a live data set may be received. For example, the machine learning models 120 may receive a feature vector from the live data set 152. Feature vectors may be input from the live data set 152 to the machine learning models 120 in any suitable order.

At 904, category probabilities may be generated. For example, the machine learning models 120 may be configured with the list of categories that were received at the computing device 100 along with the catalog entries that were used to generate the feature vectors in the live data set 152, which may be from the same catalog as the catalog entries used to generate the feature vectors in the training data set 150. The machine learning models 120 may output category probabilities, which may be sets of probabilities that the item in the catalog entry used to generate the feature vector belongs to categories from the list of categories for the catalog as determined by the machine learning models 120. Each of the machine learning models 120xxx that receives the feature vector as input may output its own category probabilities.

At 906, label categories may be generated from the category probabilities. For example, the labeler 510 may determine label categories for the catalog entry used to generate the feature vector based on the category probabilities output by the machine learning models 120 based on that feature vector. The labeler 510 may determine label categories in any suitable manner. For example, the labeler 510 may average the probabilities for each category across the category probabilities output from the machine learning models 120, and may add a category to the label categories if the average is above some threshold. The labeler 510 may only use the category probabilities output by the machine learning model that had the highest performance, for example, least error, as determined by the evaluator 410. The labeler 510 may determine which categories have a category probability above a threshold among a plurality of the different sets of category probabilities.

At 906, the label categories may be stored with the catalog entry. For example, the label categories output by the labeler 510 may be added to the catalog entry for the feature vector in the labeled catalog entries 154, which may be stored in the storage 140. The labeled catalog entries 154 may be catalog entries with an item that has been labeled with categories from the list of categories by the machine learning models 120 and the labeler 510. The labeled catalog entries 154 may be used in any suitable manner. For example, the label categories may be used when searches of the catalog are conducted so that catalog entries with labels responsive to a search query can be returned. The label categories may also be used to provide structure to catalog entries when they are displayed, for example, to a user of an e-commerce website.

Figure 10:
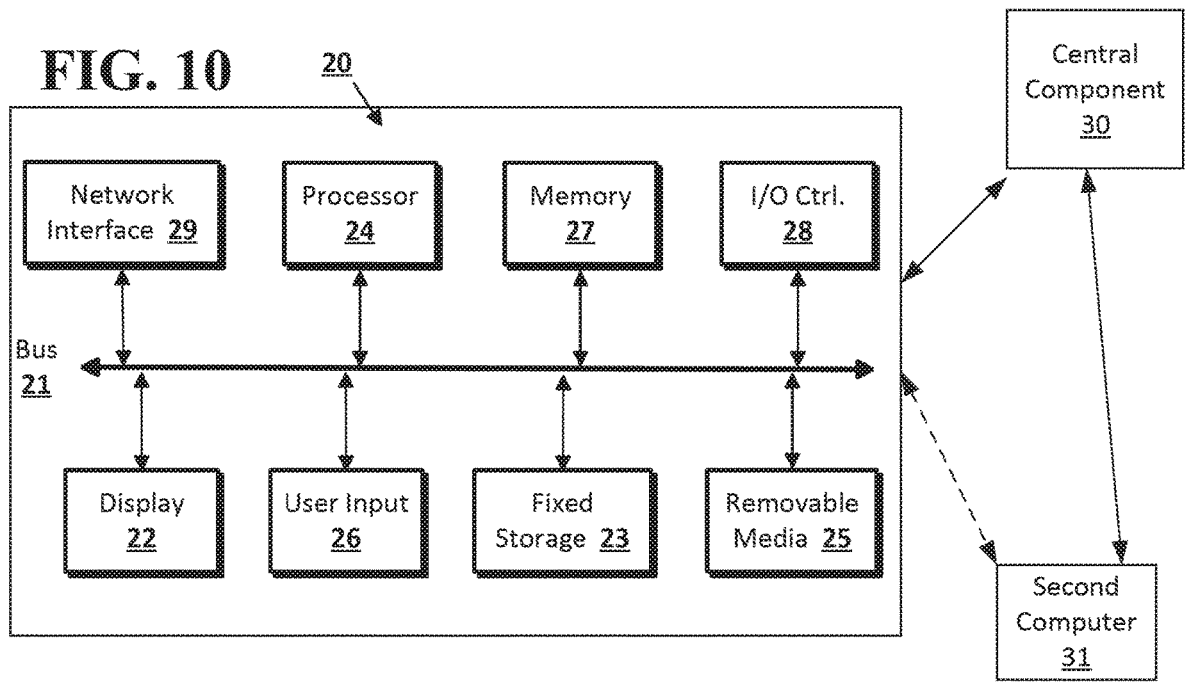
FIG. 10 shows a computer according to an implementation of the disclosed subject matter.

Implementations of the presently disclosed subject matter may be implemented in and used with a variety of component and network architectures. FIG. 10 is an example computer 20 suitable for implementing implementations of the presently disclosed subject matter. As discussed in further detail herein, the computer 20 may be a single computer in a network of multiple computers. As shown in FIG. 10, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touch-screen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 11.

Many other devices or components (not shown) may be connected in a similar manner (e.g., document scanners, digital cameras and so on). Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, removable media 25, or on a remote storage location.

Figure 11:
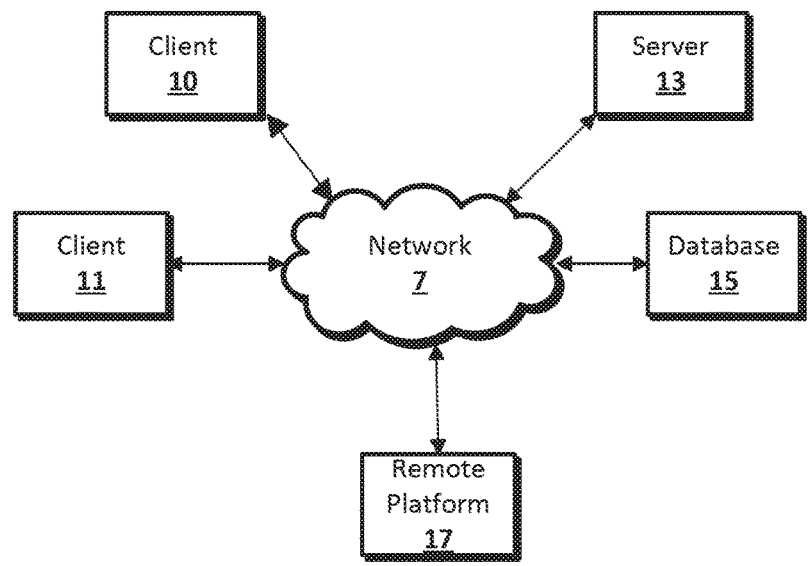
FIG. 11 shows a network configuration according to an implementation of the disclosed subject matter.

FIG. 11 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving a catalog entry and a list of categories, wherein the catalog entry is associated with an item;
   generating a textual description by comparing words in the catalog entry to one or more existing vocabularies of words and applying part-of-speech tagging to the catalog entry;
   generating a feature vector from the textual description by applying one or more of token frequency feature creation, term frequency-inverse document frequency feature creation, and pre-trained word embeddings to the textual description; and
   determining a set of probabilities by inputting the feature vector into a machine learning model, wherein the set of probabilities comprises a probability for each category in the list of categories.

2. The computer-implemented method of claim 1, further comprising:
   receiving a selection of categories from the list of categories;
   comparing the set of probabilities to the selection of categories to determine an error; and
   training the machine learning model using the error.

3. The computer-implemented method of claim 1, further comprising:
   receiving additional catalog entries and additional selections from the list of categories;
   generating textual descriptions for the additional catalog entries;
   generating feature vectors from the textual descriptions;
   determining sets of probabilities by inputting the feature vectors into the machine learning model and one or more additional machine learning models;
   comparing the sets of probabilities to the additional selections from the list of categories to determine errors for the sets of probabilities; and
   discarding at least one machine learning model from among the machine learning model and the one or more additional machine learning models based on the determined errors for the sets of probabilities from the machine learning model and the one or more additional machine learning models.

4. The computer-implemented method of claim 3, wherein discarding at least one machine learning model from among the machine learning model and the one or more additional machine learning models based on the determined errors for the sets of probabilities from the machine learning model and the one or more additional machine learning models further comprises:
   ranking the machine learning model and the one or more additional machine learning models according to the determined errors; and
   discarding a percentage of the machine learning model and the one or more additional machine learning models that are the lowest ranked based on having higher determined errors.

5. The computer-implemented method of claim 3, further comprising:
adding one or more machine learning models to replace the at least one discarded machine learning model.

6. The computer-implemented method of claim 1, further comprising:
determining, from the set of probabilities, label categories from the list of categories; and
storing the label categories with the catalog entry.

7. The computer-implemented method of claim 1, wherein generating a textual description by comparing words in the catalog entry to one or more existing vocabularies of words and applying part-of-speech tagging to the catalog entry comprises tokenizing the catalog entry.

8. The computer-implemented method of claim 1, wherein the machine learning model is a Bayesian model, an ensemble classification tree, or a recurrent neural network.

9. The computer-implemented method of claim 1, wherein the catalog entry comprises one or more of hyperlinks, XML, tags, and custom notes.

10. A computer-implemented system for multi-label product categorization comprising:
one or more storage devices; and
a processor that receives a catalog entry and a list of categories, wherein the catalog entry is associated with an item, generates a textual description by comparing words in the catalog entry to one or more existing vocabularies of words and applying part-of-speech tagging to the catalog entry, generates a feature vector from the textual description by applying one or more of token frequency feature creation, term frequency-inverse document frequency feature creation, and pre-trained word embeddings to the textual description, and determines a set of probabilities by inputting the feature vector into a machine learning model, wherein the set of probabilities comprises a probability for each category in the list of categories.

11. The computer-implemented system of claim 10, wherein the processor further receives a selection of categories from the list of categories, compares the set of probabilities to the selection of categories to determine an error, trains the machine learning model using the error.

12. The computer-implemented system of claim 10, wherein the processor further receives, additional catalog entries and additional selections from the list of categories, generates textual descriptions for the additional catalog entries, generates feature vectors from the textual descriptions, determines sets of probabilities by inputting the feature vectors into the machine learning model and one or more additional machine learning models, compares the sets of probabilities to the additional selections from the list of categories to determine errors for the sets of probabilities, and discards at least one machine learning model from among the machine learning model and the one or more additional machine learning models based on the determined errors for the sets of probabilities from the machine learning model and the one or more additional machine learning models.

13. The computer-implemented system of claim 12, wherein the processor discards at least one machine learning model from among the machine learning model and the one or more additional machine learning models based on the determined errors for the sets of probabilities from the machine learning model and the one or more additional machine learning models by ranking the machine learning model and the one or more additional machine learning models according to the determined errors and discarding a percentage of the machine learning model and the one or more additional machine learning models that are the lowest ranked based on having higher determined errors.

14. The computer-implemented system of claim 12, wherein the processor further adds one or more machine learning models to replace the at least one discarded machine learning model.

15. The computer-implemented system of claim 10, wherein the processor further determines, from the set of probabilities, label categories from the list of categories and stores the label categories with the catalog entry.

16. The computer-implemented system of claim 10, wherein the processor generates a textual description by comparing words in the catalog entry to one or more existing vocabularies of words and applying part-of-speech tagging to the catalog entry by tokenizing the catalog entry.

17. The computer-implemented system of claim 10, wherein the machine learning model is a Bayesian model, an ensemble classification tree, or a recurrent neural network.

18. The computer-implemented system of claim 10, wherein the catalog entry comprises one or more of hyperlinks, XML, tags, and custom notes.

19. A system comprising: one or more computers and one or more storage devices storing instructions which are operable, when executed by the one or more computers, to cause the one or more computers to perform operations comprising:
receiving a catalog entry and a list of categories, wherein the catalog entry is associated with an item;
generating a textual description by comparing words in the catalog entry to one or more existing vocabularies of words and applying part-of-speech tagging to the catalog entry;
generating a feature vector from the textual description by applying one or more of token frequency feature creation, term frequency-inverse document frequency feature creation, and pre-trained word embeddings to the textual description; and
determining a set of probabilities by inputting the feature vector into a machine learning model, wherein the set of probabilities comprises a probability for each category in the list of categories.

20. The system of claim 19, wherein the instructions further cause the one or more computers to perform operations further comprising:
receiving additional catalog entries and additional selections from the list of categories;
generating textual descriptions for the additional catalog entries;
generating feature vectors from the textual descriptions;
determining sets of probabilities by inputting the feature vectors into the machine learning model and one or more additional machine learning models;
comparing the sets of probabilities to the additional selections from the list of categories to determine errors for the sets of probabilities; and
discarding at least one machine learning model from among the machine learning model and the one or more additional machine learning models based on the determined errors for the sets of probabilities from the machine learning model and the one or more additional machine learning models.

\* \* \* \* \*